United States Patent
Uchida et al.

[11] 3,894,857
[45] July 15, 1975

[54] PROCESS FOR EXCHANGING ALKALI IONS FOR THALLIUM IONS IN A GLASS FIBER

[75] Inventors: Teiji Uchida; Shogo Yoshikawa, both of Tokyo; Ken Koizumi, Itami, all of Japan

[73] Assignee: Nippon Selfoc Company, Limited, c/o Nippon Electric Company, Ltd., Tokyo, Japan

[22] Filed: Jan. 23, 1974

[21] Appl. No.: 435,769

Related U.S. Application Data

[60] Division of Ser. No. 266,574, June 27, 1972, abandoned, which is a continuation of Ser. No. 839,428, July 7, 1969, abandoned.

[30] Foreign Application Priority Data
July 6, 1968 Japan.................................. 43-47305
Nov. 18, 1968 Japan.................................. 43-84253

[52] U.S. Cl................................. 65/3; 65/4; 65/30
[51] Int. Cl............................................ C03c 15/00
[58] Field of Search ................... 65/3, 30, DIG. 7, 4

[56] References Cited
UNITED STATES PATENTS

| | | | |
|---|---|---|---|
| 3,486,808 | 12/1969 | Hamblem............................ | 65/30 X |
| 3,563,057 | 2/1971 | Rosenbauer............................ | 65/30 |
| 3,633,992 | 1/1972 | Uch Ida et al................... | 65/DIG. 7 |
| 3,647,406 | 3/1972 | Fisher...................................... | 65/30 |
| 3,817,731 | 6/1974 | Yoshiyagawa.......................... | 65/32 |

*Primary Examiner*—S. Leon Bashore
*Assistant Examiner*—Frank W. Miga
*Attorney, Agent, or Firm*—Hopgood, Calimafde, Kalil, Blaustein & Lieberman

[57] ABSTRACT

A novel laser comprises a fiber-like light transmission medium having a gradient in the refractive index which is greatest at its axis and gradually decreases toward the surface and which includes activable ions substantially uniformly distributed throughout.

3 Claims, 5 Drawing Figures

PROCESS FOR EXCHANGING ALKALI IONS FOR THALLIUM IONS IN A GLASS FIBER

This is a division of application Ser. No. 266,574, filed June 27, 1972, and now abandoned, which in turn was a continuation of application Ser. No. 839,428, filed July 7, 1969, and also abandoned.

BACKGROUND OF THE INVENTION

Solid-state laser elements which are capable of high power and continuous oscillation have recently been put into practical use. It is believed that in the near future these will replace the gas laser elements widely in use now. Such solid-state elements should be as small in dimension and weight as possible, and the saturation level should be as high as possible to afford a high output level. A light wave amplifier or an optical image intensifier employing such a laser element has proved to show high amplification characteristics even with a low-level input light wave.

Most of the elements thus far developed which are capable of continuous oscillation are of the elongated cylindrical shape. They are, however, not sufficiently practical unless the exciting power necessary for optical pumping, to induce laser oscillation and amplification, is lowered to a considerable extent. One approach to lower the excitation power would be to make the diameter of the cylinder smaller. This introduces, however, several disadvantages: it increases the diffraction loss introduced by the optical cavity resonator; the element tends to easily affect the diffraction loss when it is bent; a thinner laser element requires a narrower convergence of the light beam incident at its end surface; and, to increase the amplification degree, the axial length of the laser element should be made large, unavoidably enlarging the diameter. Moreover, conventional laser elements always introduce problems in positioning, setting of the angle of incidence, and bending.

In "Applied Physics Letters", Apr. 15, 1963 issue, pages 151 to 152, C. G. Young describes the oscillation characteristics of a laser oscillator employing a laser glass fiber. The fibrous laser element introduced in this article is formed of a core glass body which has a relatively high refractive index and includes activated ions; and an outer glass body of relatively lower refractive index covering the core. The laser light and the flourescence generated within the core body travel therethrough, repeating total reflections at the bordering surface between the core and outer bodies.

With these "clad-type" fibers of amplifying capability, some of the defects involved in the above-mentioned laser elements of uniform refractive index type are obviated. However, since the excitation of the laser active element (irradiation of the core glass body) with the irradiation light rays is carried out only through the outer body, and since the bordering surface between the core and the outer bodies forms a reflective surface, the irradiation efficiency is not very high. To suppress the reflection at the bordering surface, the refractive index difference should be as low as possible. However, this unavoidably results in a decrease in the critical angle for the total reflection of the travelling light wave, allowing the travelling light waves to emanate from the bordering surface more easily.

Moreover, in the clad-type laser element which resorts (for light wave transmission) to repeated total reflections at the bordering surface, a difference in the length of optical paths arises between a plurality of light beams, eventually causing a phase velocity difference in the light beams to arise at the output end of the element. Therefore, it is quite possible in a laser element of this kind that a monochromatic laser oscillation, even if it once arises, cannot be maintained because oscillation at other wavelengths within the flourescent band tends to be excited by the aforementioned difference in the phase velocity. When used as an amplifier element, the clad-type laser element is not capable of amplifying a high-speed light pulse train, nor of transmitting an optical image projected on the input end surface thereof, because of the difference in the lengths of the optical paths taken by the light rays. Moreover, small protrusions and retractions inevitably formed on the bordering surface between the core and outer bodies cause scattering components to arise in the travelling light waves, eventually causing the undesirable oscillation within the laser amplifier element.

OBJECT OF THE INVENTION

Accordingly, it is the object of the present invention to provide a solid-state element of the fiber type which includes laser-active substances, and which is capable of operating as a highly efficient laser oscillator and also as a high-gain amplifier for an ultra-high speed pulse train or an optical image.

SUMMARY OF THE INVENTION

Briefly, the invention is predicated upon a fiberlike or rod-shaped cylindrical light transmission medium having a gradient in the refractive index which is greatest at its axis and gradually decreases toward its surface whereby a light beam incident upon one end surface at an angle of incidence smaller than a critical value travels along the axis oscillating about it virtually without divergence. Such a light transmission medium with activable ions included therein makes it possible to carry out laser amplification or oscillation without causing a difference in the phase velocity. By employing a light transmission means of this type, it becomes possible to provide a light wave amplifier for an ultra-high-speed pulse train or an optical image which is formed of light rays having wavelength components common to that of the laser functions as an amplifier.

The laser element of the invention greatly improves the irradiation efficiency, because the irradiated light rays directed to the side surface of the element are concentrated upon the axis due to the aforementioned gradient and because the laser light beam produced by the irradiation is propagated through the light guide oscillating about the axis.

The above mentioned and other features and objects of this invention and the manner of attaining them will become more apparent and the invention itself will best be understood by reference to the following description of embodiments of the invention taken in conjunction with the accompanying drawings, the description of which follows.

FIG. 1 graphically shows the characteristic curves of a laser element according to this invention;

DETAILED DESCRIPTION OF THE INVENTION

Figure 1:
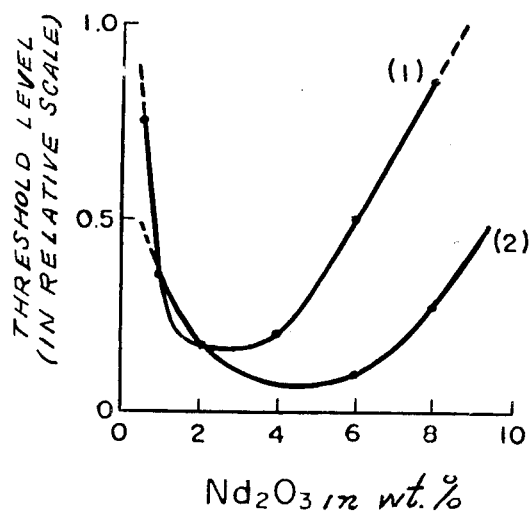

As analyzed by S. E. Miller in The Bell System Technical Journal, November 1965 issue, pages 2017 to 2064, the refractive index $n$ at a point of radial distance $x$ from the axis of an elongated cylindrical light guide whose refractive index decreases from the axis toward surface is expressed by $$n = n_o (1 - \frac{a}{2} \times 2) \ (a > 0), \quad (1)$$

where $n_o$ is the refractive index at the axis and $a$ is a positive constant. A light beam mode incident upon the light guide at the input end surface forming an angle $\theta$ with the axis takes, within the light guide, an optical path defined by $$x = \frac{1}{\sqrt{a}} \tan \theta \cdot \sin \sqrt{a} \, Z.$$

Therefore, assuming that the radius of the cylindrical light guide is given by $R_o$, all the light beams entering into the light guide with the angle of incidence smaller than $\theta_c$ given by $$\theta_c = \tan^{-1}(\sqrt{a} \cdot R_o)$$

are propagated through the light guide virtually without divergence.

The method of manufacturing a fiber-like or rod-shaped glass light guide which has the above-mentioned gradient in the refractive index is described in detail in co-pending application Ser. No. 806,368 now abandoned. Briefly, this process is based upon the chemical substitution of first cations included within a glass rod and capable of forming modifying oxides, by second cations capable of forming modifying oxides. The substitution is carried out by bringing the glass rod into contact with a salt bath containing the second cations, which has the ratio of electron polarizability to (ion radius)$^3$ different from that of the first cations. More particularly, the glass rod is immersed in the salt bath and heated up to such a temperature as will allow the first and second cations to diffuse within and into the glass rod. As the second cations diffuse into the glass rod, the first cations, which have been contained within the glass rod emerge from the glass. Thus, the first cations contained in the glass rod are substituted by the second cations contained in the salt bath. The concentration within the glass rod of the second cations diffused into the rod is highest at the surface and decreases toward the axis. The concentration of the first cations has a gradient quite opposite to that of the second cations. If the ratio of electron polarizability to (ion radius)$^3$ of the second cations is smaller than the corresponding ratio of the first cations, the glass rod has, after the ion substitution process, such a gradient in the refractive index as is lowest at the surface and increases toward the axis. In the vicinity of the axis, the refractive index would be equal to that of the glass rod before being subjected to the ion substitution. Conversely, if the above-mentioned electron polarizability to (ion radius)$^3$ ratio of the second cations is greater than that of first cations, the refractive index of the glass rod after the processing would be high at the surface and would decrease toward the axis. Suitable selection of the salt and glass body leads to the desired gradient in the refractive index with respect to the cross-section of the glass rod.

A thin fiber-like glass laser element of a thickness of 0.2mm in diameter including 20 weight percent of $Tl_2O$, 12 weight percent of $Na_2O$, 15 weight percent of $PbO$, and 48 weight percent of $SiO_2$, and 5 weight percent of $Nd_2O_3$ as the activable oxide is immersed for several tens of hours in a bath of potassium nitrate maintained at a temperature high enough to allow the above-mentioned diffusion to arise. The rod is then rinsed and dried. The refractive index $n$ of the sample is 1.59 at its axis and 1.56 at the surface, with the gradient expressed by $$n = n_o (1 - \frac{a}{2} \times 2),$$

where x denotes the radial distance from the axis, and $a = 378 \text{ cm}^{-2}$.

The composition of the laser glass rod itself may be that of a conventional laser element of the kind. More particularly, those silicate glass, borate glass, or phosphate glass which includes activable ions such as neodymium, ytterbium, erbium, samarium, and holmium ions may be used as the basic glass rod.

The relationship between the concentration of the activable oxides includes in the glass laser element and the threshold energy level needed for initiation of oscillation will be described hereunder.

A glass rod formed of $SiO_2$—$K_2O$—$BaO$ glass, or $SiO_2$—$K_2O$—$PbO$ glass with trivalent neodymium ion $Nd^{+3}$ included has a threshold energy level dependent on the weight percentage of $Nd_2O_3$(the activable oxide included in the rod). In FIG. 1, in which the weight percentage of $Nd_2O_3$ is taken along the abscissa and in which the threshold energy level is taken along the ordinate (in relative scale) the energy levels are plotted against the change in the weight percentage of $Nd_2O_3$ ranging from 0.5 weight percent to 8 weight percent. Curve(1) shows the characteristics of the laser element formed of $SiO_2$—$K_2O$—$BaO$ glass and curve(2) shows that of $SiO_2$—$K_2O$—$PbO$ glass. It is apparent from these curves that the threshold energy level is dependent on the weight percentage of the activable oxide $Nd_2O_3$ and that the threshold energy level is generally lower for $SiO_2$—$K_2O$—$PbO$ glass than for $SiO_2$—$K_2O$—$BaO$ glass.

Now the invention will be described in further detail in conjunction with several examples.

EXAMPLE 1

As is described in the above-mentioned copending application, a rod-shaped glass body of the thickness of 0.2mm in diameter including 20 weight percent of $Tl_2O$, 12 weight percent of $Na_2O$, 15 weight percent of $PbO$, 3 weight percent of $Nd_2O_3$, 2 weight percent of $UO_2$, and 48 weight percent of $SiO_2$ is immersed for 50 hours in a bath of potassium nitrate heated to 480°C to allow cations in the salt to diffuse into the glass body. After this ion substitution process, the glass rod is rinsed and dried. The refractive index of the glass rod is 1.60 at its axis and 1.57 at its surface, with the gradient thereof expressed by $$n = n_o(1 - \tfrac{1}{2}ar^2),$$

where $r$ is the radial distance from the axis and $a = 326$ cm$^{-2}$. The rod is cut into a cylindrical laser element of a length of 10 cm. The gradient of the refractive index within the glass rod is attributed to the substitution of thallium and sodium ions within the rod by the potassium ions included in the bath.

Figure 2:
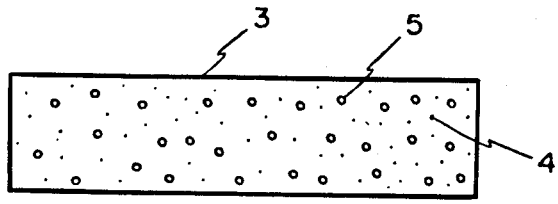
FIGS. 2 and 3 show longitudinal cross-sectional views of two embodiments of the present invention.

FIG. 2 schematically shows the longitudinal crosssectional view of the laser element manufactured by the above mentioned process. As is shown, within the glass body 3, the neodymium ions ($Nd^{3+}$) 4 serving as the activable oxide needed for laser oscillation and uranium ion ($U^{4+}$) 5 are distributed uniformly. This laser rod proves to be very effective in laser oscillation and amplification with high efficiency.

EXAMPLE 2

A pipe-shaped glass body of the thickness of 0.2mm and 0.15mm in inner and outer diameters, respectively, is fused with a rod-shaped glass body of the thickness of 0.15mm in diameter to form one complete rod-shaped glass body. Before the fusion process, the pipe includes 20 weight percent of $Tl_2O$, 12 weight percent of $Na_2O$, 20 weight percent of PbO, and 48 weight percent of $SiO_2$, while the core portion includes 20 weight percent of $Tl_2O$, 12 weight percent of $Na_2O$, 16 weight percent of PbO, 4 percent of $Nd_2O_3$, and 48 weight percent of $SiO_2$. These compositions are kept unchanged even after the fusion process, except for the fused bordering surface therebetween.

Figure 3:
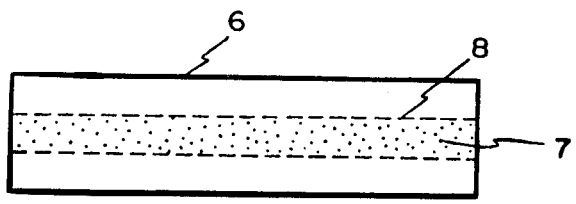

The resultant rod-shaped glass body is then subjected to the ion substitution process in the potassium nitrate bath, and is then cut into a rod of a length of 10 cm. Thus, there is provided a laser element having such a refractive index as is highest at its axis and decreases toward its surface. FIG. 3 schematically shows the glass rod manufactured through this process. The reference numeral 6 denotes the outer glass body; 8, the core portion; and 7, the neodymium ions ($Nd^{3+}$) distributed uniformly within the core portion.

In this laser rod, the neodymium ions 7($Nd^{3+}$) are uniformly distributed only in the axial portion where the laser oscillation is generated and propagated. The excitation light rays irradiating the rod are effectively concentrated onto the axial portion where the neodymium ions are distributed.

While the process of manufacturing the laser element of the present invention has been described above in conjunction with the fiber-like glass element, the fundamental principle of the present invention based on the incorporation of the laser-active materials into a fibrous solid-state element having such a refractive index as is greatest at its axis and decreases toward its surface is applicable to a similar fibrous solid-state element made of elements other than glass. In this connection, the method of giving the aforementioned gradient in the refractive index to fibrous transparent plastics is detailed in the copending patent application and since the process of incorporating laser-active substance into such fibrous plastics are well known to the engineers in this technical field, the process itself adapted to fibrous plastic light guides will not be described further.

Figure 4:
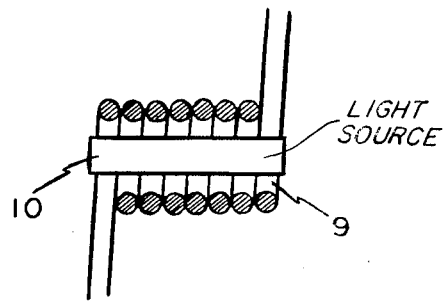
FIG. 4 shows a longitudinal cross-sectional view of an embodiment of the invention coupled to an exciting means.

FIG. 4 schematically shows the combination of a rectilinear irradiation light source 10 and the present laser rod formed into a helix.

With this structure, almost all the irradiation light rays are directed to the laser material. The irradiation efficiency is accordingly very high. A cylindrical reflector may be disposed surrounding the helical laser element 9 to further improve the irradiation efficiency.

Figure 5:
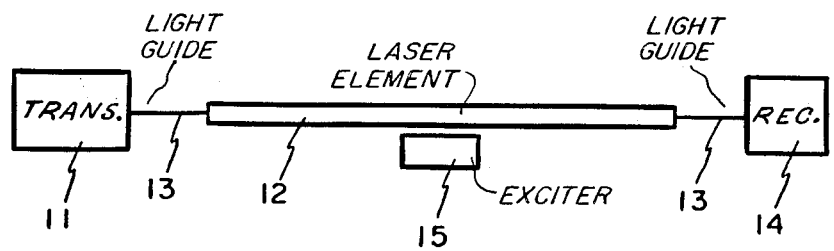
FIG. 5 schematically shows an optical communication system employing the element of the present invention.

The laser element of the present invention as applied to an optical amplifier for use as a repeater of an optical communication system is illustrated in FIG. 5. In the drawing, the reference numeral 11 denotes a light wave trasmitter including a laser oscillator for producing a carrier light wave, and means for modulating the output carrier wave with a signal to be transmitted. A light wave transmission path 13-12-13 is made of a transparent light guide whose refractive index has the above-mentioned gradient in its cross section and at least a part of which (12) includes the activable oxides to form the laser element equivalent to the laser rod of the present invention. Light wave receiver 14 is provided for demodulating the transmitted light wave and exciter 15 irradiates the active light guide portion 12 so as to effect the optical pumping within the light guide.

The modulated light rays emanating from the transmitter 11 undergo attenuation while travelling through the light guide 13. If the intensity level of the transmitted light rays at the input of the receiver 14 is lower than a lowest allowable level, the quality of communication would be extremely deteriorated. To compensate for the loss involved in transmission, light wave amplification should be performed between the transmitter 11 and receiver 14. In the illustrated optical system, the transmission loss is compensated for by the amplification carried out by the laser element portion 12, which is excited by the irradiation light source 15. It is readily apparent to those skilled in the art that the number of laser element portions 12 may be selected approximately depending on the distance between the transmitter 11 and receiver 14 and the transmissivity of the light guide portions 13.

As will be understood from the foregoing description of FIG. 5, the light guide can be lengthened without limit to provide a long-distance optical communication system for highly multiplexed optical pulse signals.

Also, the quadratic gradient in the refractive index of the light guide 13 is equivalent in its function to an array of lenses, each having extremely small aberration. It follows, therefore, that an optical image projected upon the light guide 13 at its one end surface can be transmitted therethrough without any substantial distortion. In such a case, the laser active portion 12 serves as a high-efficiency image amplifier or intensifier for those optical images which are formed by laser light rays generated by activable ions similar to those of portion 12, and having the wavelengths common to those peculiar to the activable ions.

The combination of the laser element portion 12 with a suitable optical system readily forms an image intensifier or a long-distance image transmission system. As will be apparent from the structure of FIG. 5, the laser element portion 12 can be formed by incorporating activable oxides into the light guide 13 at predetermined intervals.

While the principles of the invention have been described in connection with specific apparatus, it is to be clearly understood that this description is made only by way of example and not as a limitation to the scope of the invention.

We claim:

1. A process for fabricating a glass fiber laser element in which the refractive index increases from the surface to the longitudinal axis thereof, said method comprising the steps of providing a glass body including ions of a rare earth metal and ions of thallium uniformly distributed therein, and immersing said glass body into a heated molten salt of an alkali metal to allow ions of said alkali metal to diffuse into said glass body, whereby said thallium ions are exchanged by ions of said alkali metal and the concentration of said thallium ions decreases from the axis of said laser element toward its surface, thereby to achieve a gradient in the refractive index of said glass body.

2. The method of claim 1, in which said glass body is formed by fusing a pipe-shaped glass body having an outer diameter and an inner diameter and a rod-shaped glass body having a diameter substantially equal to said inner diameter of said pipe-shaped glass body.

3. The method of claim 1, in which said glass body further includes, prior to said immersion step replaceable sodium ions distributed uniformly therein, said ions of said alkali metal from said heated molten salt being exchanged for some of said replaceable sodium ions, during said immersion step.

* * * * *